US008243910B2

(12) United States Patent
Chen et al.

(10) Patent No.: US 8,243,910 B2
(45) Date of Patent: Aug. 14, 2012

(54) SINGLE POINT OF CONTACT PERSONAL COMMUNICATION SYSTEM

(75) Inventors: Yen-Fu Chen, Austin, TX (US); John Hans Handy-Bosma, Cedar Park, TX (US); Nancy Sun, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/175,312

(22) Filed: Jul. 17, 2008

(65) Prior Publication Data

US 2008/0292065 A1 Nov. 27, 2008

Related U.S. Application Data

(63) Continuation of application No. 11/039,535, filed on Jan. 20, 2005, now Pat. No. 7,672,440.

(51) Int. Cl.
*H04M 3/42* (2006.01)
(52) U.S. Cl. ............... 379/211.01; 370/352; 379/88.17; 379/88.18; 379/88.19; 379/88.22; 379/142.06; 379/142.15; 379/201.01; 379/373.02; 455/401; 455/412.2; 455/414.1; 709/203; 709/225; 709/229
(58) Field of Classification Search .......... 370/259–271, 370/351–356; 379/67.1–88.28, 142.01–142.18, 379/201.01–218.02, 220.01–221.15, 37–51, 379/93.01–93.04, 372–386; 709/201–207, 709/217–230; 348/14.01–14.16; 455/404.1, 455/404.2, 412.1–417, 426.1, 426.2, 461–466, 455/550.1–560; 704/270–278
See application file for complete search history.

(56) References Cited

U.S. PATENT DOCUMENTS

| | | | |
|---|---|---|---|
| 5,166,972 A | | 11/1992 | Smith |
| 5,329,578 A | * | 7/1994 | Brennan et al. .......... 379/211.03 |
| 5,511,111 A | | 4/1996 | Serbetcioglu et al. |
| 5,544,229 A | | 8/1996 | Creswell et al. |
| 5,559,860 A | | 9/1996 | Mizikovsky |
| 5,600,704 A | | 2/1997 | Ahlberg et al. |
| 5,668,862 A | | 9/1997 | Bannister et al. |
| 5,717,741 A | | 2/1998 | Yue et al. |
| 5,802,160 A | | 9/1998 | Kugell et al. |

(Continued)

OTHER PUBLICATIONS

USPTO Final Office Action for U.S. Appl. No. 11/039,535, dated Jul. 20, 2009, pp. 1-6.

*Primary Examiner* — Hemant Patel
(74) *Attorney, Agent, or Firm* — Yee & Associates, P.C.; Mark C. Vallone; Rudolf O. Siegesmund

(57) ABSTRACT

A computer/telephony integrated single-point-of-contact system (CISS) enabling a user to contact another using multiple devices with a single contact attempt is disclosed. A plurality of computer programs residing in a computer use a subscriber database, authorization database, priority list database, and device attributes database to determine how to respond to a request to contact a subscriber. If the request is an emergency, the computer repeatedly contacts all of the subscriber's devices until a response is received. Otherwise, the computer contacts the subscriber's devices in a sequential order determined by the subscriber. The computer can also delete redundant un-received messages from a subscriber's devices and create a real-time connection between the requester and the subscriber, if it is technically possible, at the subscriber's request.

12 Claims, 8 Drawing Sheets

U.S. PATENT DOCUMENTS

| | | | |
|---|---|---|---|
| 5,956,390 A * | 9/1999 | McKibben et al. | 379/93.07 |
| 5,999,611 A | 12/1999 | Tatchell et al. | |
| 6,028,514 A | 2/2000 | Lemelson et al. | 340/539 |
| 6,160,877 A | 12/2000 | Tatchell et al. | |
| 6,161,008 A | 12/2000 | Lee et al. | |
| 6,295,346 B1 | 9/2001 | Markowitz et al. | |
| 6,301,350 B1 | 10/2001 | Henningson et al. | |
| 6,405,035 B1 * | 6/2002 | Singh | 455/414.1 |
| 6,535,585 B1 * | 3/2003 | Hanson et al. | 379/88.12 |
| 6,535,596 B1 | 3/2003 | Frey et al. | |
| 6,643,355 B1 * | 11/2003 | Tsumpes | 379/45 |
| 6,694,004 B1 | 2/2004 | Knoerle et al. | |
| 6,697,478 B1 * | 2/2004 | Meldrum et al. | 379/211.04 |
| 6,728,341 B1 | 4/2004 | Puchek et al. | 379/49 |
| 6,748,054 B1 * | 6/2004 | Gross et al. | 379/88.12 |
| 6,792,094 B1 * | 9/2004 | Kirkpatrick | 379/209.01 |
| 6,798,772 B2 | 9/2004 | Bergman et al. | |
| 6,816,582 B2 | 11/2004 | Levine et al. | |
| 6,898,274 B1 * | 5/2005 | Galt et al. | 379/211.02 |
| 6,944,444 B1 | 9/2005 | Gillespie et al. | |
| 7,027,569 B2 | 4/2006 | Price | |
| 7,035,390 B2 * | 4/2006 | Elliott | 379/201.02 |
| 7,042,989 B2 | 5/2006 | Lawson et al. | |
| 7,062,028 B2 * | 6/2006 | Holt et al. | 379/211.03 |
| 7,117,445 B2 * | 10/2006 | Berger | 715/752 |
| 7,142,841 B1 | 11/2006 | Almassy | |
| 7,184,533 B1 | 2/2007 | Shaffer et al. | |
| 7,215,753 B2 | 5/2007 | Parra Moyano et al. | |
| 7,248,686 B2 | 7/2007 | Mahajan et al. | |
| 7,295,661 B2 | 11/2007 | Akhteruzzaman | |
| 7,305,079 B1 | 12/2007 | Forte | |
| 7,406,330 B2 | 7/2008 | McConnell et al. | |
| 7,664,233 B1 * | 2/2010 | Kirchmeier et al. | 379/37 |
| 7,672,440 B2 * | 3/2010 | Chen et al. | 379/209.01 |
| 2002/0006137 A1 * | 1/2002 | Rabenko et al. | 370/466 |
| 2002/0031207 A1 * | 3/2002 | Lin | 379/88.17 |
| 2002/0184346 A1 * | 12/2002 | Mani | 709/220 |
| 2003/0063733 A1 * | 4/2003 | Levine et al. | 379/211.04 |
| 2003/0069002 A1 | 4/2003 | Hunter et al. | 455/404 |
| 2003/0112952 A1 | 6/2003 | Brown et al. | |
| 2004/0096042 A1 | 5/2004 | Orwick et al. | 379/45 |
| 2004/0223598 A1 | 11/2004 | Spiridellis | |
| 2004/0233892 A1 * | 11/2004 | Roberts et al. | 370/352 |
| 2005/0069097 A1 | 3/2005 | Hanson et al. | |
| 2005/0129069 A1 * | 6/2005 | Binder | 370/493 |
| 2005/0186943 A1 * | 8/2005 | Hasan et al. | 455/413 |

* cited by examiner

FIG. 2

| SUBSCRIBER KEY | MESSAGE | DEVICE 1 | DEVICE 2 | DEVICE 3 | DEVICE 4 |
|---|---|---|---|---|---|
| A | 1 | PENDING | DELIVERED | PENDING | PENDING |
| A | 2 | DELIVERED | DELIVERED RECEIVED | PENDING | PENDING |
| B | 1 | DELIVERED | PENDING | PENDING | PENDING |
| B | 2 | DELIVERED | DELIVERED ANSWERED | CANCEL | CANCEL |

FIG. 10

| SUBSCRIBER KEY | DEVICE | SUBSCRIBER STATUS | POLL STATUS | INSTRUCTION POINTER |
|---|---|---|---|---|
| A | 1 |  | OFF |  |
| A | 2 | VACATION | ON | aa |
| A | 3 |  | ON |  |
| A | 4 |  | OFF |  |
| B | 1 |  | ON |  |
| B | 2 |  | ON |  |
| B | 3 | VACATION | OFF | ba |
| B | 4 | TRAVEL | OFF | bb |

FIG. 11

SINGLE POINT OF CONTACT PERSONAL COMMUNICATION SYSTEM

CROSS-REFERENCE TO RELATED APPLICATION(S)

This application is a continuation application of U.S. utility patent application entitled "Single Point of Contact Personal Communication System" filed on Jan. 20, 2005 and accorded Ser. No. 11/039,535 now U.S. Pat. No. 7,672,440, and claims priority therefrom.

FIELD OF THE INVENTION

The present invention relates to communication systems in general, and in particular to a system for one individual to contact another using multiple devices with a single contact attempt.

BACKGROUND OF THE INVENTION

Single point of contact personal communication systems are desirable for providing a way for one individual to contact another using multiple devices with a single contact attempt. Many individuals use multiple devices and methods to stay in contact with others. Unfortunately, it can be difficult for a person seeking to contact an individual who uses multiple devices and methods for communication because it is unclear what is the best method or device to use. In addition, the requester may not have access to the contact information for all of the individual's devices. Time can be wasted trying multiple methods or trying to locate unknown contact information for the devices, and the person being contacted can wind up with multiple redundant messages on their devices that have to be addressed. Speed in contacting a person is particularly important in the case of an emergency, but the plethora of devices and methods that are designed to make it possible to contact someone in a broad range of circumstances can instead create confusion and delays.

The use of personal emergency, safety warning systems and methods is known in the prior art. For example, U.S. Pat. No. 6,028,514 to Lemelson et al. (the '514 patent) discloses a personal emergency, safety warning system and method. However, the '514 patent does not actively seek contact with any specific individual, and has further drawbacks of requiring an individual to have a specialized receiver.

U.S. Pat. No. 6,728,341 to Puchek et al. (the '341 patent) discloses a monitoring and communication system for stationary and mobile persons that monitors a supervised person. However, the '341 patent does not contact an individual using multiple devices in a sequence defined by that individual, and additionally does not allow the monitored individual to delete redundant inquiries from multiple devices.

Similarly, U.S. Patent Application Publication No. 2002/0184346 to Mani (the '346 published application) discloses an emergency notification and override service in a multimedia-capable network that effectuates a subscriber-selectable notification scheme with respect to an incoming emergency message directed to a subscriber from an authorized entity. However, the '346 published application publication does not allow an individual to be contacted with non-emergency messages, and does not use the expiration of an allotted time to denote message delivery failure.

In addition, U.S. Patent Application Publication No. 2003/0069002 to Hunter et al. (the '002 published application) discloses a system and method for emergency notification content delivery that disseminates emergency notification content from an emergency originating source. However, the '002 published application does not connect the transmitting party to the user for real-time communication upon request of the user after verifying that the user's device supports real-time communication with the transmitting party, and also does not notify users of nonemergency messages.

Lastly, U.S. Patent Application Publication No. 2004/0096042 to Orwick et al. (the '042 published application) discloses an emergency telephone call notification service system and method that provides emergency telephone call notification. However, the '042 published application does not actively attempt to notify a specific individual, and further lacks the ability to contact devices other than telephones.

A need exists for a single point of contact personal communication system that can be used to initiate contact attempts on multiple devices when a user makes a single attempt on one device.

SUMMARY OF THE INVENTION

The invention that meets the need described above is a computer/telephony integrated single-point-of-contact system (CISS) that allows a person to initiate multiple attempts to reach a subscriber on multiple devices by only making a single attempt to contact that subscriber on one device. CISS comprises a computer linked to a plurality of databases, a telephone interface attached to the computer, an Internet interface attached to the computer, and a plurality of computer programs in memory or storage connected to the computer. The plurality of databases include device an attributes database, a subscriber database, an authorization database, a device status database, and a message status database. The computer programs determine how to respond to a request to contact a subscriber. If the request is an emergency, the computer repeatedly contacts all of the subscriber's devices until a response is received. Otherwise, the computer contacts the subscriber's devices in a sequential order determined by the subscriber. The computer can also delete redundant un-received messages from a subscriber's devices and create a real-time connection between the requester and the subscriber, if it is technically possible, at the subscriber's request.

The subscriber database stores contact information about individuals. The authorization database stores information about who is authorized to contact a particular subscriber. The device attributes database stores contact information for each subscriber device, along with a time interval to wait before contacting the next device if the subscriber does not respond. The priority list database stores information about the order in which a subscriber's devices are to be contacted. The device status database stores information regarding whether the device is operational as well as its user's status. The message status database stores information regarding the delivery and receipt of messages. When a user makes a call on one device, a computer program searches the subscriber database and finds a plurality of corresponding records in the device attributes database and uses the telephone interface and the Internet interface to send a message to a plurality of devices.

CISS allows an individual to configure a system so that all of their devices can be contacted at once or contacted in a desired sequence in response to a single request for contact. Furthermore, CISS allows users to optionally delete redundant messages from their devices and to initiate real-time communication with the requester if it is technically feasible. CISS allows the individual being contacted to give out only one method for contacting the individual while still allowing the request for contact to be received on any of their devices. Thus CISS allows the individual to gain the convenience of being contacted on any of their devices while maintaining privacy in terms of what types of devices they have and how the individual can be reached directly.

BRIEF DESCRIPTION OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 2 is a schematic of the computer/telephone integrated single-point-of-contact system in an integrated communications supplier environment;

FIG. 10 is a schematic of the device status database; and

FIG. 11 is a schematic of the message status database.

DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software" refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention.

Figure 1:
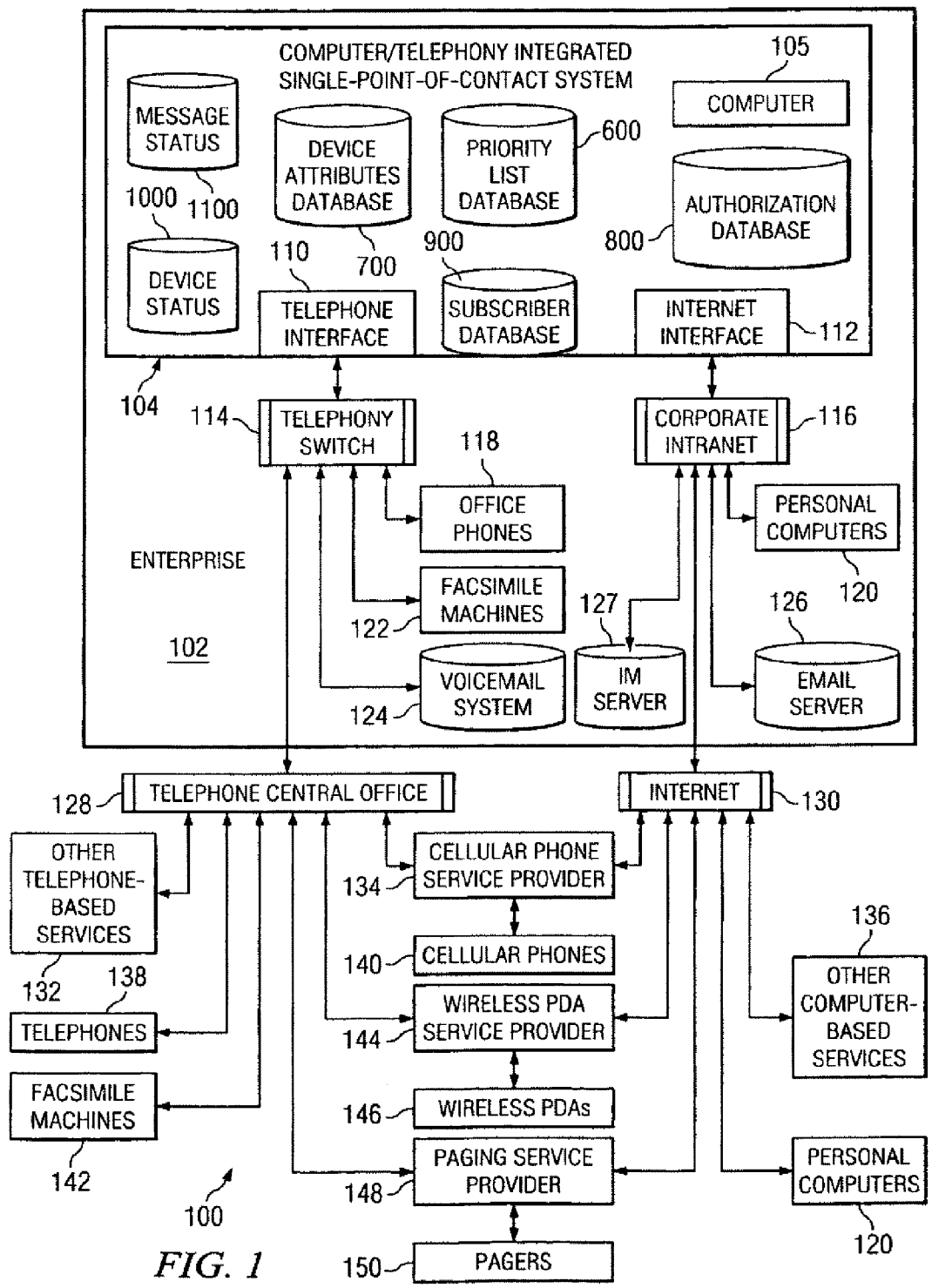
FIG. 1 is a schematic of the computer/telephone integrated single-point-of-contact system (CISS) in an enterprise environment.
Figure 6A:
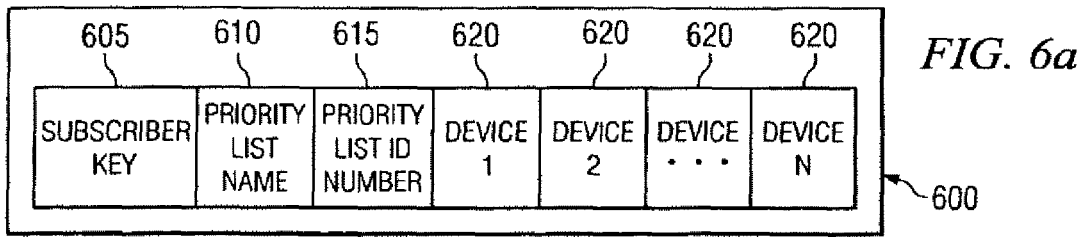
FIG. 6a is a schematic of the priority list database.
Figure 6B:
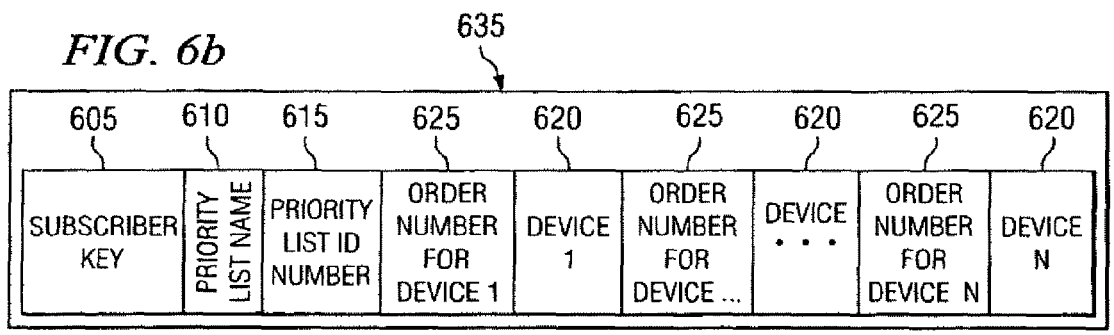
FIG. 6b is a schematic of an alternative embodiment of the priority list database.

FIG. 1 illustrates computer/telephony integrated single-point-of-contact system (CISS) 104 installed in enterprise 102 (hereafter referred to collectively as "the first system"). Enterprise 102 is a business, such as a corporation, which is oriented towards facilitating contact with the employees of enterprise 102. CISS 104 has computer 105 connected to priority list database 600, device attributes database 700, authorization database 800, subscriber database 900, device status database 1000 and message status database 1100. Computer 105 is the central management server for CISS 104. Subscriber database 900 stores information about individuals first system 100 can contact. Authorization database 800 stores information about who is authorized to use first system 100 to contact a particular subscriber. Device attributes database 700 stores contact information for each subscriber device 620 (as shown in FIG. 6A and FIG. 6B), along with a time interval to wait before contacting the next subscriber device 620 if the subscriber does not respond. Priority list database 600 stores information about the order in which a subscribe's devices 620 are to be contacted.

CISS 104 has telephone interface 110 and Internet interface 112 so that it can contact telephonic and text-based devices 620. For contacting devices 620 contained within enterprise 102, telephone interface 110 is connected to telephony switch 114, such as a Private Branch Exchange, and Internet interface 112 is connected to corporate intranet 116. Telephony switch 114 provides first system 100 with access to devices 620 such as office phones 118, facsimile machines 122, and voicemail system 124 within enterprise 102. Corporate intranet 116 provides access to personal computers 120, e-mail server 126 and Instant Messaging (IM) server 127 located within enterprise 102. From telephony switch 114 and corporate intranet 116, system 100 can also access devices 620 outside of enterprise 102. Telephony switch 114 is connected to telephone central office 128. Telephone central office 128 enables first system 100 to contact cellular phones 140 through cellular phone service providers 134, wireless Personal Digital Assistants (PDAs) 146 through wireless PDA service providers 144, pagers 150 through paging service providers 148, facsimile machines 142, telephones 138, and other telephone-based services 132.

Corporate intranet 116 is connected to Internet 130. Internet 130 provides first system 100 with access to cellular phones 140 through cellular phone service providers 134, wireless PDAs 146 through wireless PDA service providers 144, pagers 150 through paging service providers 148, personal computers 120, and other computer-based services 136. Through these connections, first system 100 can contact devices 620 with voice messages, text messages, or both depending upon the capabilities of devices 620 and how the subscriber has configured device attributes database 700. The subscriber does not have to reveal any information to the requester about the nature of their devices 620 other than how to contact first system 100, and first system 100 can initiate a real-time connection between the requester and the subscriber at the subscriber's request if it is technically feasible.

Figure 2:
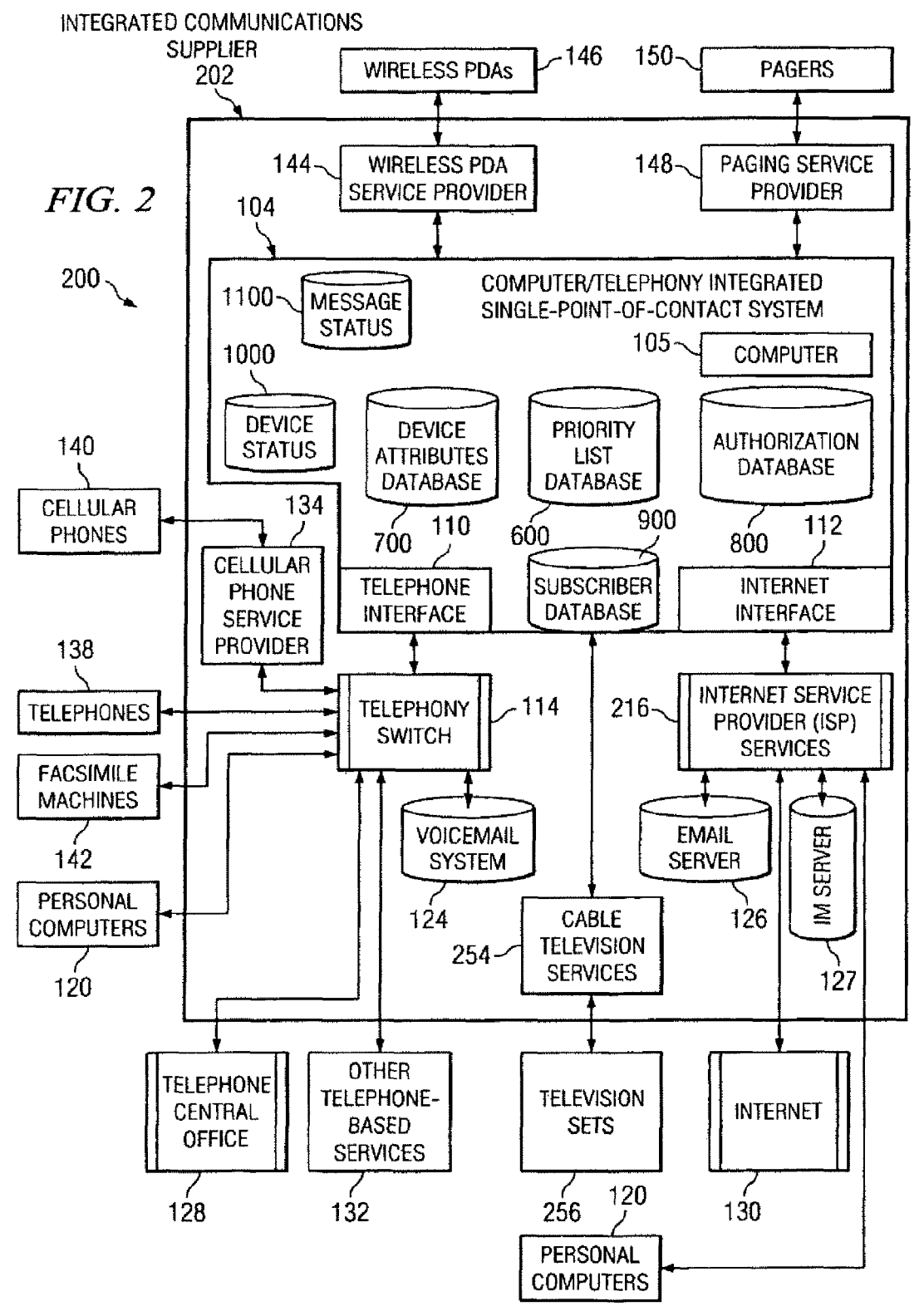

FIG. 2 depicts CISS 104 installed in integrated communications supplier 202 (hereafter referred to collectively as "the second system"). Integrated communications supplier 202 is a business oriented towards providing services to third parties, including consumers and small companies. In this example, integrated communications supplier 202 is a utility that acts as paging service provider 148, wireless PDA service provider 144, cellular phone service provider 134, cable television service provider 254, and Internet service provider 216. However, integrated communications supplier 202 need not supply all of these services itself, and may utilize connections to other integrated communications suppliers to provide services. CISS 104 has computer 105 connected to priority list database 600, device attributes database 700, authorization database 800, subscriber database 900, device status database 1000 and message status database 1100. Computer 105, subscriber database 900, authorization database 800, device attributes database 700, and priority list database 600 have the same purpose they have in first system 100 embodiment of the current invention. CISS 104 has telephone interface 110 and Internet interface 112 so that it can contact telephonic and text-based devices 620. Telephone interface 110 is connected to telephony switch 114, and Internet interface 112 is connected to Internet service provider 216. Telephony switch 114 provides system 200 with access to telephones 138, facsimile machines 142, personal computers 120, telephone central office 128, and other telephone-based services 132. A connection to cellular phone service providers 134 provides access to cellular phones 140. Internet service provider 216 provides a connection to e-mail server 126, instant messaging (IM) server 127, personal computers 120, and Internet 130. CISS 104 is also connected to pagers 150 through paging service providers 148, wireless PDAs 146 through Wireless PDA service providers 144, and television sets 256 through cable television service providers 254. Like first system 100, second system 200 can contact the subscriber using text or voice-based devices 620 and maintains the subscriber's privacy. Second system 200 can also establish a real-time connection between the subscriber and the requester if desired and technically feasible.

Figure 3:
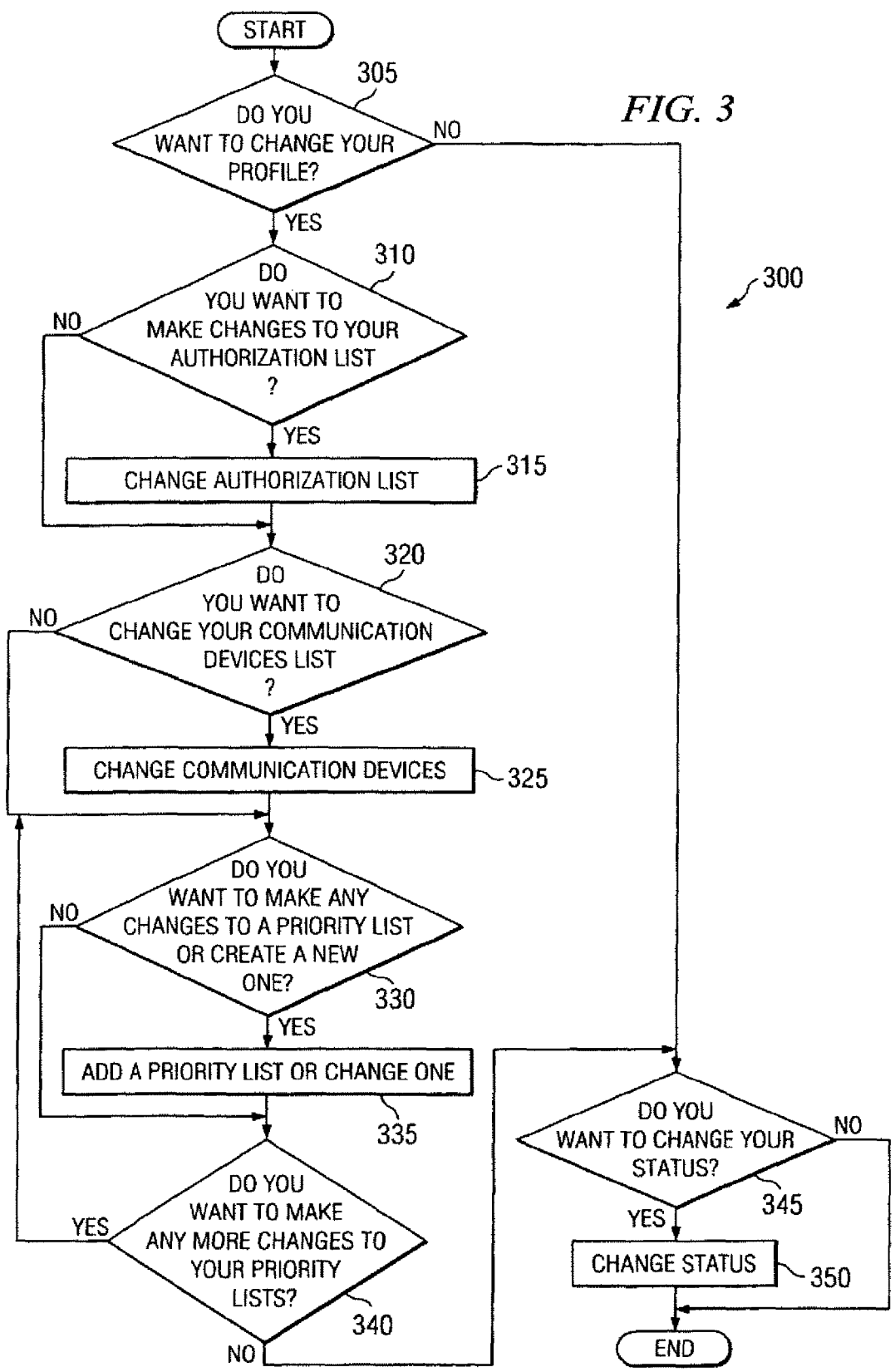
FIG. 3 is a flow diagram of the process for configuring the authorization database, device attributes database, priority list database, and subscriber database.

FIG. 3 depicts first program 300 for configuring the authorization database, device attributes database, priority list database, and subscriber database of the present invention. First program 300 begins when the subscriber contacts first system 100 or second system 200. If the subscriber wants to change their profile (305), first program 300 presents the subscriber with the opportunity to make changes to the subscriber's authorization list (310). If the subscriber answers affirmatively, first program 300 makes subscriber-directed changes to the authorization list (315). After the subscriber makes changes to the authorization list, or if no changes were desired, first program 300 gives the subscriber the opportunity to make changes to the subscriber's communication devices list (320). If the subscriber answers affirmatively, first program 300 makes subscriber-directed changes to the communication devices list (325). After the subscriber makes changes to their communication devices list, or if no changes were desired, first program asks if the subscriber wants to make any changes to the subscriber's priority lists or to create a new one (330). If the subscriber answers affirmatively, first program 300 adds a priority list or changes one in response to the subscriber's instructions (335). After the subscriber makes changes or adds a priority list, first program 300 asks if the subscriber wants to make any more changes to his or her priority lists (340). If the subscriber answers affirmatively, steps 330, 335, and 340 repeat until the user responds to step 340 in the negative. Once the subscriber has finished making changes to the subscriber's priority lists, or if no changes were desired, first program 300 presents the subscriber with the opportunity to change the subscriber's status, including which priority list is currently active (345). If the subscriber answers affirmatively, the system changes the subscribers status (350) in response to instructions from the subscriber. Once any changes to the subscriber's status are made, or if no changes were desired, the first program 300 terminates.

Figure 4A:
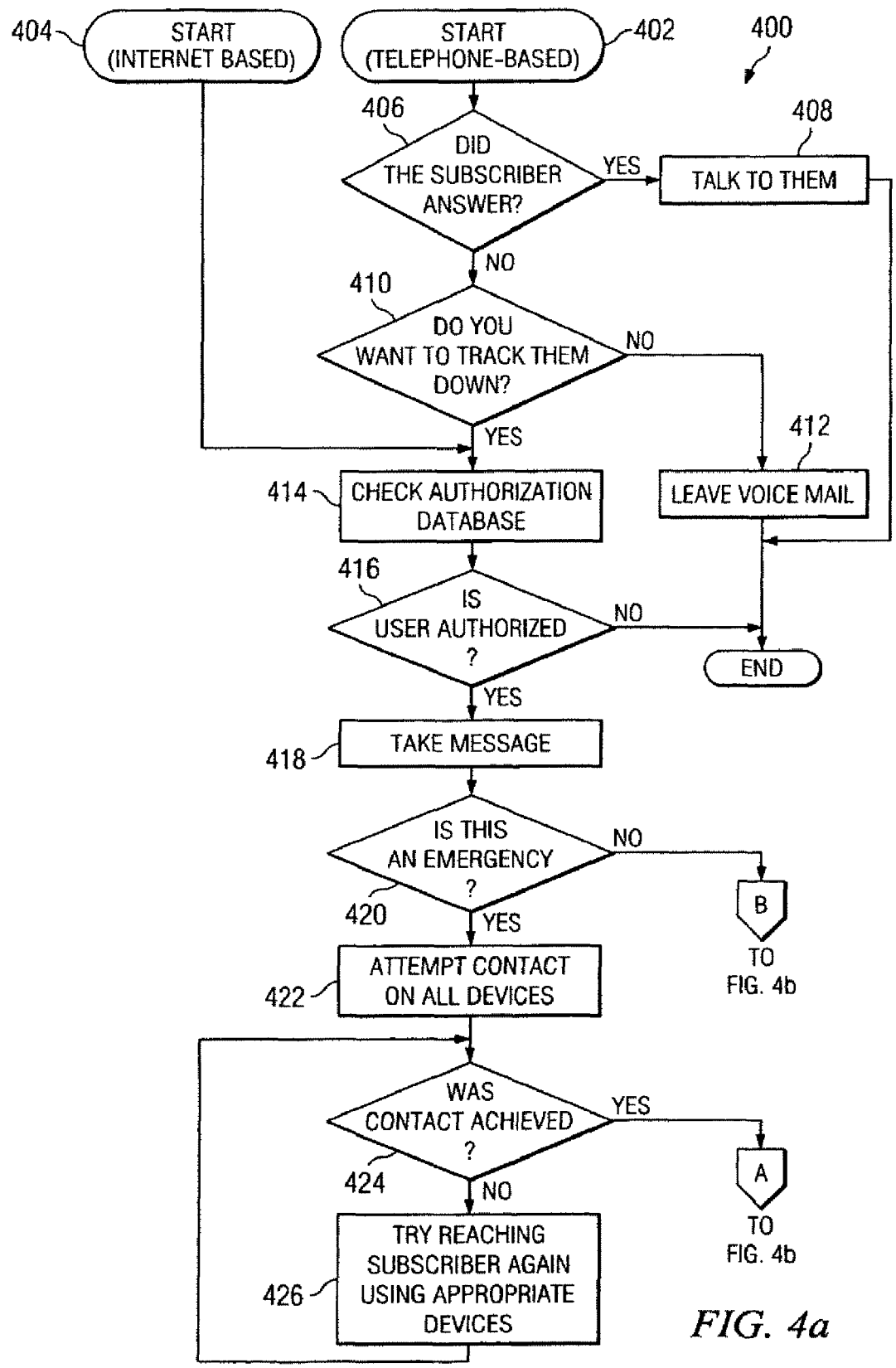
FIG. 4a is a flow diagram of the process for contacting an individual using the single point of contact personal communication system.
Figure 4B:
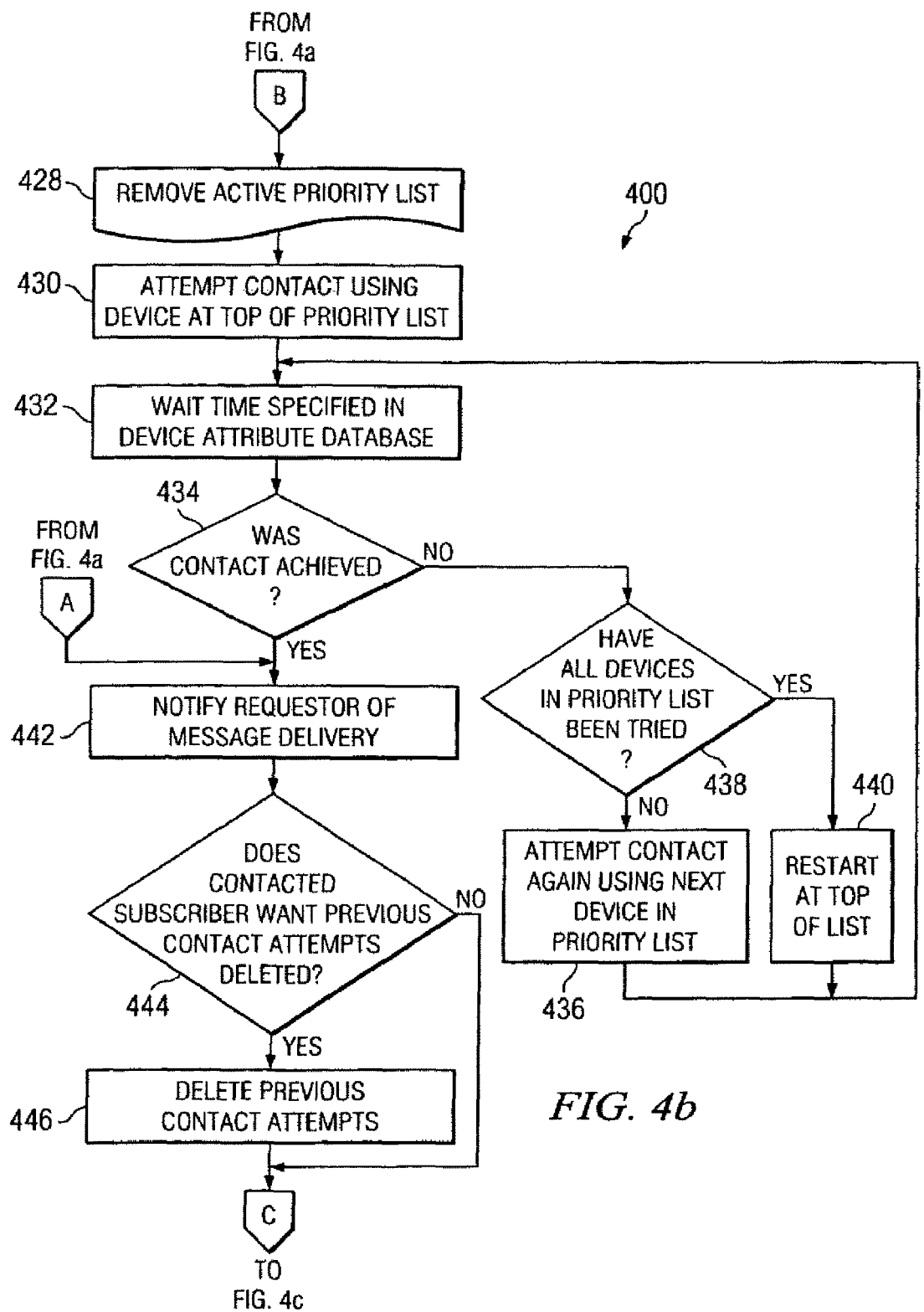
FIG. 4b is a flow diagram of the process for contacting an individual using the single point of contact personal communication system.
Figures 4C, 5:
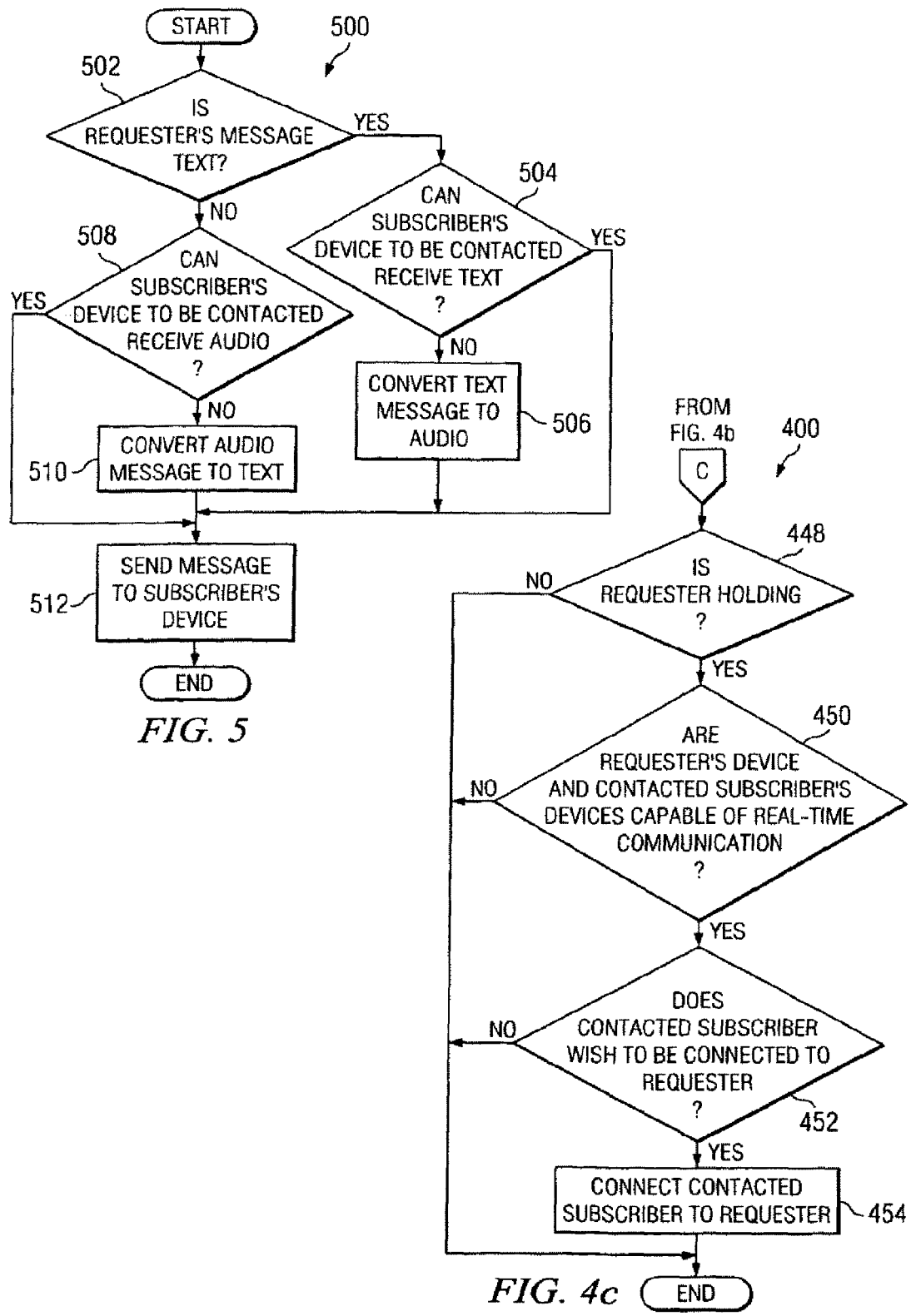
FIG. 4c is a flow diagram of the process for contacting an individual using the single point of contact personal communication system.
FIG. 5 is a flow diagram of the process for converting the user's message to a format that is compatible with the individual's devices.

FIGS. 4a through 4c depicts second program 400. Second program 400 begins when a requester attempts to communicate with a subscriber by contacting first system 100 or second system 200 by telephone (402) or by Internet (404). If the initial contact is by telephone, second program 400 monitors to see if the subscriber answers (406). If the subscriber answers, then the requester is permitted to talk to them (408), and second program 400 terminates. If the subscriber does not answer, the requester is given the opportunity to request that the subscriber be tracked down (410). If the requester responds negatively, then the requester can leave voicemail (412), and second program 400 terminates. If the requester responds affirmatively, or if the requester initiated contact by the Internet, second program 400 checks the authorization database (414) and determines if the requester is authorized (416). If the user is not authorized, then second program 400 terminates. If the requester is authorized, then second program 400 takes a message from the requester (418) and then inquires if the message regards an emergency (420). If it is an emergency, second program 400 attempts contact on all devices (422) and monitors first system 100 or second system 200 to determine if contact was achieved (424). If contact is not achieved, second program 400 tries contacting the subscriber again using appropriate devices (426). Second program 400 repeats steps (424) and (426) until contact is achieved.

If the situation is not an emergency, then second program 400 retrieves the active priority list (428) and attempts to contact the subscriber using the device at the top of the priority list (430). After waiting the amount of time specified in the device attributes database (432), second program 400 checks to see if contact was achieved (434). If contact was not achieved, second program 400 checks to see if all of the devices in the priority list have been tried (438). If they have not been tried, second program 400 again attempts contact using the next device in the priority list (436), and to repeat steps (432), (434), (438), and (436) until step (438) indicates that all devices in the priority list have been tried. Once all devices have been tried, second program 400 restarts at the top of the priority list (440) and resumes repeating steps (432), (434), (438), (436) and, when applicable, (440) until contact is achieved. Once contact is achieved, regardless of whether the situation is an emergency or not, second program 400 notifies the requester of message delivery (442) and gives the contacted subscriber the option of deleting previous contact attempts (444). If the subscriber answers affirmatively, second program 400 deletes previous un-received contact attempts from all devices (446).

Once the previous contact attempts have been deleted, or if the contacted subscriber did not want to delete the previous contact attempts, second program 400 determines if the requester is still holding (448). If the requester is not holding, then second program 400 terminates. If the requester is holding, second program 400 checks to see if the requester's device and the contacted subscriber's device are capable of real-time communication (450). If this is not the case, then second program 400 terminates. Otherwise, second program 400 asks the contacted subscriber if they wish to be connected to the requester (452). If the response is negative, second program 400 terminates. Otherwise, second program 400 connects the contacted subscriber to the requester (454), and then second program 400 terminates.

FIG. 5 depicts third program 500. Third program 500 is invoked during steps (422), (426), (430), and (436) of second program 400 to ensure that the requester's message is in a form that can be received by the device that second program 400 is attempting to contact. Third program 500 first determines if the requester's message is text (502). If the message is text, then third program 500 checks device attributes database 700 to determine if the subscriber's device can receive text (504). If the subscriber's device can receive text, then third program 500 sends the text message to the subscriber's device (512), and third program 500 terminates. If the subscriber's device cannot receive text, then third program 500 converts the text message to an audio message (506). Conversion of the text message to an audio message may be accomplished using known speech synthesis software. Third program 500 then sends the resulting audio message to the subscriber's device (512), and third program 500 terminates. If the requester's message is not text, third program 500 checks device attributes database 700 to determine if the subscriber's device can receive audio (508). If the subscriber's device can receive audio, then third program 500 sends the audio message to the subscriber's device (512), and third program 500 terminates. If the subscriber's device cannot receive audio, then third program 500 converts the audio message to a text message (510). Conversion of the audio message to a text message may be accomplished using known speech recognition software. Third program 500 then sends the resulting text message to the subscribers device (512), and third program 500 terminates. Third program 500 works in the same manner if a requester's message is audio. The words "text" and "audio" may be exchanged in FIG. 5 to depict the operation of third program 500 when the requester's message is audio.

FIG. 6a depicts priority list database 600. Priority list database 600 has one or more priority list records 600 containing subscriber key 605, priority list name 610, priority list ID number 615, and a listing of one or more devices 620. In the preferred embodiment, priority list 600 contains devices 620 used to contact the subscriber in the order they are used. Subscriber key 605 is used to index records in priority list database 600, device attributes database 700, authorization database 800, and subscriber database 900. Priority list name 610 and priority list ID number 615 allow each subscriber to maintain and manage a plurality of priority list records in priority list database 600 if desired.

FIG. 6b depicts alternate priority list database 635 having the same priority list records as priority list database 630 but also having an order number 625 for each device 620. In this embodiment, priority list 635 stores devices 620 in no particular order, and order number 625 for each device 620 is used to determine the order of usage of devices 620 for contacting the subscriber.

Figure 7:
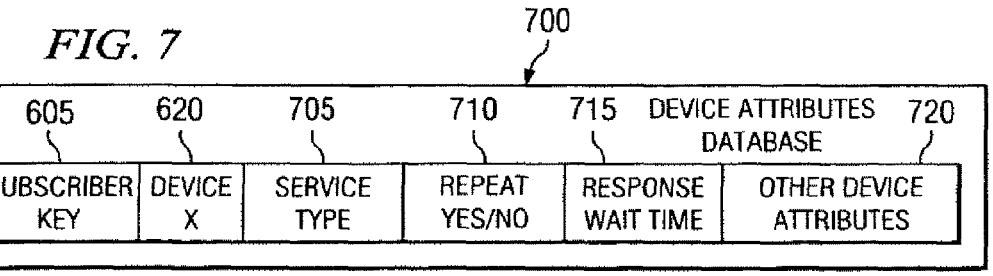
FIG. 7 is a schematic of the device attributes database.

FIG. 7 depicts device attributes database 700 having one more records containing subscriber key 605, devices 620, service type 705, repeat flag 710, response wait time 715, and other device attributes 720. Device attributes database 700 provides CISS 104 with information about how to interact with subscriber's devices 620. Service type 705 and other device attributes 720 tell CISS 104 what types of messages each device 620 can receive, how to contact the device 620, and whether or not device 620 is capable of real-time communication using one or more message types. Repeat flag 710 indicates whether or not repeated attempts should be made to contact the subscriber using this device 620. For example, calling a cellular phone again may be appropriate, but sending an additional e-mail would be redundant. Response wait time 715 tells CISS 104 how long to wait before contacting the next device in priority list 600 or alternate priority list 635. In the case of an emergency situation, CISS 104 will ignore priority list 600 or alternate priority list 635, repeat flag 710, and response wait time 715 and immediately contact all devices 620 and continue doing so at subscriber-defined intervals until a response from the subscriber is received.

Figure 8:
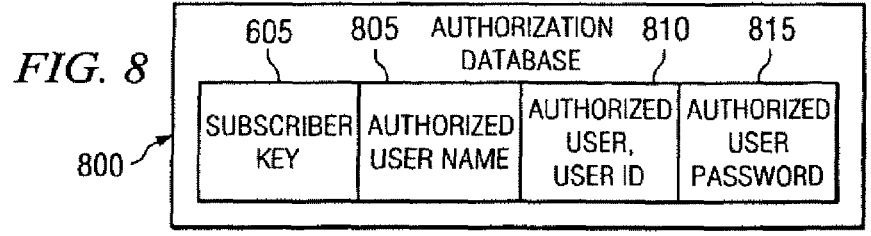
FIG. 8 is a schematic of the authorization database.

FIG. 8 depicts authorization database 800 having subscriber key 605, authorized user name 805, authorized user ID 810, and authorized user password 815. Authorization database 800 is used by the subscriber to maintain a list of authorized users who can use system 100 to contact them. Second program 400 matches the information supplied by the requester with authorized user ID 810 and authorized user password 815 before initiating contact attempts (see FIG. 4a, steps 414 and 416). Authorization database 800 may also include information that assigns a particular priority list 600 to requests from a specific requester.

Figure 9:
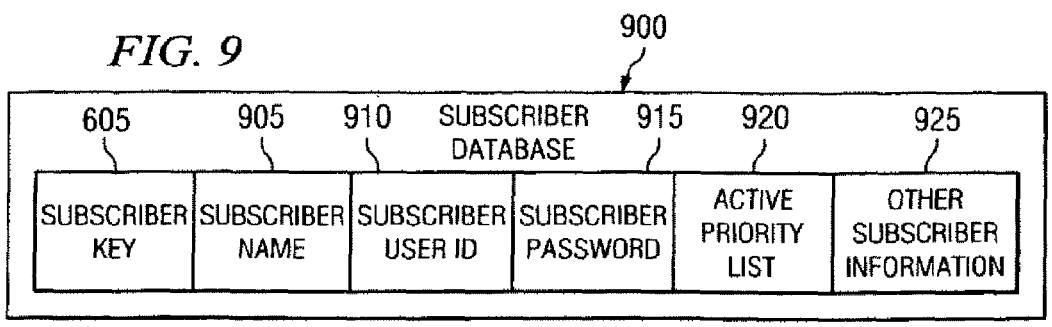
FIG. 9 is a schematic of the subscriber database.

FIG. 9 depicts subscriber database 900 having subscriber key 605, subscriber name 905, subscriber user ID 910, subscriber password 915, active priority list 920, and other subscriber information 925. One example of other subscriber information would be election of an automatic cancellation option. By automatic cancellation option is meant a choice whereby a subscriber can activate instructions to CISS 102 that after a message has been delivered to one device, and after an answer has been received from the recipient of the delivered message, all attempts to deliver the same message to other devices will be cancelled. Another example of other subscriber information is that a subscriber can enter instructions to amend or alter priority and cancellation based upon subscriber entry of a subscriber status. Such a subscriber status could be that the subscriber is on vacation, or that the subscriber will be traveling for several days, and by entering a vacation or a travel status, any priority, delivery, and cancellation instructions can be amended or altered accordingly. Second program 400 matches information supplied by the subscriber with subscriber user ID 910 and subscriber password 915 before allowing the subscriber to initiate first program 300. Active priority list 920 determines the default priority list 600 or alternate priority list 635 that system 100 or system 200 should use in response to a contact request unless it is overridden by information in the authorization database 800.

FIG. 10 depicts device status database 1000 showing an array having message column 1020 and the following representative device columns: device 1 column, device 2 column 1040, device 3 column 1050 and device 4 column 1060. In the example, two subscriber keys are represented by A and B. Subscriber A has not activated automatic cancellation 930 in the subscriber database 900, while subscriber B has activated automatic cancellation 930. A subscriber can make such an election by adding such a desire to the subscriber database 900. Two messages have been sent to subscriber A. The status of message 1 can be seen in each device column. In this case, message 1 is pending for device 1 (meaning that delivery has not been completed), message 1 has been delivered to device 2, message 1 is pending for device 3 and also pending for device 4. For subscriber A, message 2 has been delivered to device 1 and device 2, and is pending for device 3 and 4. For subscriber B, message 1 has been delivered for device 1 and is pending for devices 2 through 4. For subscriber B, message 2 is delivered to device 1 and 2 and attempts to deliver message 2 to devices 3 and 4 have been cancelled. The cancellation occurred because subscriber B had activated automatic cancellation, and the message status for device 2 shows that the message was delivered and also that it was answered. Therefore, as soon as the message was answered, attempts to deliver the message to the remaining devices were cancelled by CISS 104.

FIG. 11 depicts device status database 1100 showing an array having a subscriber key column 1110, a device column 1120, a subscriber status column 1130, a poll status 1140 and an instruction pointer 1150. In the example shown, subscriber A has four devices. CISS 104 has polled the devices in the system to determine whether they are accessible or not, and the status of each device is shown as either "on" or "off." Subscriber A has entered a vacation status for device 2. Instruction pointer 1150 contains pointers to an array of instructions (not shown) to alter or amend the priority, delivery, and cancellation instructions for subscriber A based upon the device status. Subscriber B has entered a "vacation" status for device 3 and a "travel" status for device 4. The CISS 104 poll of devices shows that device 3 and device 4 are off. CISS 104 will follow instructions based upon the instruction pointers activated by the subscriber status and the poll status for subscriber B.

While a current embodiment of the single point of contact personal communication system has been described in detail, it should be apparent that modifications and variations thereto are possible, all of which fall within the true spirit and scope of the invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for contacting an individual, the method comprising the steps of:
   a computer receiving a request from a user to contact an individual;
   the computer, responsive to finding that the request is a phone call, ringing a telephone of the individual;
   the computer, responsive to finding that the individual does not answer the telephone, giving the user a choice of leaving voicemail or tracking down the individual;
   the computer, responsive to a request to track down the individual, checking a first database to verify the user is authorized to track down the individual;
   the computer, responsive to finding that the user is authorized to track down the individual, taking a first message from the user for the individual;
   the computer sending a request to the user to indicate if the first message regards an emergency;
   the computer receiving a response to the sent request from the user;
   the computer, responsive to the response indicating the first message regards an emergency, locating a record for the individual in a second database;
   the computer sending the first message to each device in a list of devices in the record;
   the computer waiting a period of time specified for each device in the record in the second database; and
   the computer, responsive to an absence of receiving a second message from the individual after waiting the period of time, repeating the sending of the first message and the waiting until the second message is received from the individual.

2. The method of claim 1, further comprising the step of:
   the computer sending a third message to the user that the first message has been received by the individual.

3. The method of claim 1, further comprising the steps of:
   the computer determining if a device in the list of devices sending the second message is capable of real-time communication with the user;
   the computer, responsive to finding that the device sending the second message is capable of real-time communication with the user, sending a request to the individual to indicate if the individual desires to be connected to the user;
   the computer receiving a response from the individual; and
   the computer, responsive to the response from the individual indicating the individual desires to be connected to the user, communicatively connecting the individual to the user.

4. The method of claim 1, further comprising the steps of:
   the computer sending a request to the individual to indicate if the individual desires to delete the first message from all devices in the list of devices not sending the second message;
   the computer receiving a response from the individual; and
   the computer, responsive to the response from the individual indicating the individual desires the first message to be deleted from all devices in the list of devices not sending the second message, deleting the first message from all devices in the list of devices not sending the second message.

5. One or more computer-readable storage devices comprising:
   program instructions, stored in at least one of the one or more computer-readable storage devices, to receive a request from a user to contact an individual;
   program instructions, stored in at least one of the one or more computer-readable storage devices, to, in response to finding that the request is a phone call, ring a telephone of the individual;
   program instructions, stored in at least one of the one or more computer-readable storage devices, to, in response to finding that the individual does not answer the telephone, give the user a choice of leaving voicemail or tracking down the individual;
   program instructions, stored in at least one of the one or more computer-readable storage devices, to, in response to a request to track down the individual, check a first database to verify the user is authorized to track down the individual;
   program instructions, stored in at least one of the one or more computer-readable storage devices, to, in response to finding that the user is authorized to track down the individual, take a first message from the user for the individual;
   program instructions, stored in at least one of the one or more computer-readable storage devices, to send a request to the user to indicate if the first message regards an emergency;
   program instructions, stored in at least one of the one or more computer-readable storage devices, to receive a response to the sent request from the user;
   program instructions, stored in at least one of the one or more computer-readable storage devices, to, in response to the response indicating the first message regards an emergency, locate a record for the individual in a second database;
   program instructions, stored in at least one of the one or more computer-readable storage devices, to send the first message to each device in a list of devices in the record;
   program instructions, stored in at least one of the one or more computer-readable storage devices, to wait a period of time specified for each device in the record in the second database; and
   program instructions, stored in at least one of the one or more computer-readable storage devices, to, in response to an absence of receiving a second message from the individual after waiting the period of time, repeat, until the second message is received from the individual, sending the first message and waiting the period of time.

6. The one or more computer-readable storage devices of claim 5, further comprising:
program instructions, stored in at least one of the one or more computer-readable storage devices, to send a third message to the user that the first message has been received by the individual.

7. The one or more computer-readable storage devices of claim 5, further comprising:
program instructions, stored in at least one of the one or more computer-readable storage devices, to determine if a device in the list of devices sending the second message is capable of real-time communication with the user;
program instructions, stored in at least one of the one or more computer-readable storage devices, to, in response to finding that the device sending the second message is capable of real-time communication with the user, send a request to the individual to indicate if the individual desires to be connected to the user;
program instructions, stored in at least one of the one or more computer-readable storage devices, to receive a response from the individual; and
program instructions, stored in at least one of the one or more computer-readable storage devices, to, in response to the response from the individual indicating the individual desires to be connected to the user, communicatively connect the individual to the user.

8. The one or more computer-readable storage devices of claim 5, further comprising:
program instructions, stored in at least one of the one or more computer-readable storage devices, to send a request to the individual to indicate if the individual desires to delete the first message from all devices in the list of devices not sending the second message;
program instructions, stored in at least one of the one or more computer-readable storage devices, to receive a response from the individual; and
program instructions, stored in at least one of the one or more computer-readable storage devices, to, in response to the response from the individual indicating the individual desires the first message to be deleted from all devices in the list of devices not sending the second message, delete the first message from all devices in the list of devices not sending the second message.

9. A system for contacting an individual, the system comprising:
one or more processors;
one or more computer-readable storage devices;
program instructions, stored in at least one of the one or more computer-readable storage devices for execution by at least one of the one or more processors, to receive a request from a user to contact an individual;
program instructions, stored in at least one of the one or more computer-readable storage devices for execution by at least one of the one or more processors, to, in response to finding that the request is a phone call, ring a telephone of the individual;
program instructions, stored in at least one of the one or more computer-readable storage devices for execution by at least one of the one or more processors, to, in response to finding that the individual does not answer the telephone, give the user a choice of leaving voicemail or tracking down the individual;
program instructions, stored in at least one of the one or more computer-readable storage devices for execution by at least one of the one or more processors, to, in response to a request to track down the individual, check a first database to verify the user is authorized to track down the individual;
program instructions, stored in at least one of the one or more computer-readable storage devices for execution by at least one of the one or more processors, to, in response to finding that the user is authorized to track down the individual, take a first message from the user for the individual;
program instructions, stored in at least one of the one or more computer-readable storage devices for execution by at least one of the one or more processors, to send a request to the user to indicate if the first message regards an emergency;
program instructions, stored in at least one of the one or more computer-readable storage devices for execution by at least one of the one or more processors, to receive a response to the sent request from the user;
program instructions, stored in at least one of the one or more computer-readable storage devices for execution by at least one of the one or more processors, to, in response to the response indicating the first message regards an emergency, locate a record for the individual in a second database;
program instructions, stored in at least one of the one or more computer-readable storage devices for execution by at least one of the one or more processors, to send the first message to each device in a list of devices in the record;
program instructions, stored in at least one of the one or more computer-readable storage devices for execution by at least one of the one or more processors, to wait a period of time specified for each device in the record in the second database; and
program instructions, stored in at least one of the one or more computer-readable storage devices for execution by at least one of the one or more processors, to, in response to an absence of receiving a second message from the individual after waiting the period of time, repeat, until the second message is received from the individual, sending the first message and waiting the period of time.

10. The system of claim of claim 9, further comprising:
program instructions, stored in at least one of the one or more computer-readable storage devices for execution by at least one of the one or more processors, to send a third message to the user that the first message has been received by the individual.

11. The system of claim 9, further comprising:
program instructions, stored in at least one of the one or more computer-readable storage devices for execution by at least one of the one or more processors, to determine if a device in the list of devices sending the second message is capable of real-time communication with the user;
program instructions, stored in at least one of the one or more computer-readable storage devices for execution by at least one of the one or more processors, to, in response to finding that the device sending the second message is capable of real-time communication with the user, send a request to the individual to indicate if the individual desires to be connected to the user;
program instructions, stored in at least one of the one or more computer-readable storage devices for execution by at least one of the one or more processors, to receive a response from the individual; and program instructions, stored in at least one of the one or more computer-readable storage devices for execution by at least one of the one or more processors, to, in response to the response from the individual indicating the individual desires to be connected to the user, communicatively connect the individual to the user.

12. The system of claim 9, further comprising:

program instructions, stored in at least one of the one or more computer-readable storage devices for execution by at least one of the one or more processors, to send a request to the individual to indicate if the individual desires to delete the first message from all devices in the list of devices not sending the second message;

program instructions, stored in at least one of the one or more computer-readable storage devices for execution by at least one of the one or more processors, to receive a response from the individual; and program instructions, stored in at least one of the one or more computer-readable storage devices for execution by at least one of the one or more processors, to, in response to the response from the individual indicating the individual desires the first message to be deleted from all devices in the list of devices not sending the second message, delete the first message from all devices in the list of devices not sending the second message.

\* \* \* \* \*